(12) United States Patent
Hulse et al.

(10) Patent No.: US 6,690,513 B2
(45) Date of Patent: Feb. 10, 2004

(54) RHOMB INTERLEAVER (75) Inventors: Charles Andrew Hulse, Santa Rosa, CA (US); Michael R. Greenberg, Santa Rosa, CA (US); Kuochou Tai, Fremont, CA (US)

(73) Assignee: JDS Uniphase Corporation, San Jose, CA (US)

( * ) Notice: Subject to any disclaimer, the term of this patent is extended or adjusted under 35 U.S.C. 154(b) by 34 days.

(21) Appl. No.: 10/180,320

(22) Filed: Jun. 27, 2002

(65) Prior Publication Data

US 2003/0007157 A1 Jan. 9, 2003

Related U.S. Application Data (60) Provisional application No. 60/302,900, filed on Jul. 3, 2001, and provisional application No. 60/307,149, filed on Jul. 24, 2001.

(51) Int. Cl.[7] .................. G02B 27/28; G02B 27/00; G02B 5/04; H04J 14/02
(52) U.S. Cl. .................. 359/485; 359/483; 359/498; 359/577; 359/834; 359/835; 356/453; 398/65; 398/79; 398/82
(58) Field of Search .................. 356/453, 487, 356/FOR 113; 359/831, 833, 834, 835, 836, 483, 485, 487, 494, 497, 498, 577; 398/48, 65, 79, 82

(56) References Cited

U.S. PATENT DOCUMENTS

| | | | | |
|---|---|---|---|---|
| 5,122,895 A | * | 6/1992 | Takanashi et al. | 359/247 |
| 5,483,342 A | * | 1/1996 | Rockwell | 356/491 |
| 5,767,971 A | * | 6/1998 | Kawai et al. | 356/493 |
| 6,201,609 B1 | * | 3/2001 | Hill et al. | 356/491 |
| 6,573,996 B1 | * | 6/2003 | Deliwala et al. | 356/487 |
| 6,611,342 B2 | * | 8/2003 | Patel et al. | 356/519 |
| 2002/0012487 A1 | * | 1/2002 | Damask | 385/15 |
| 2002/0085252 A1 | * | 7/2002 | Chen et al. | 359/122 |
| 2002/0196540 A1 | * | 12/2002 | Zhao | 359/495 |
| 2003/0021519 A1 | * | 1/2003 | Zalevsky et al. | 385/16 |

* cited by examiner

Primary Examiner—John Juba
(74) Attorney, Agent, or Firm—Allen, Dyer, Doppelt, Milbrath & Gilchrist, P.A.

(57) ABSTRACT

Interleavers are a useful tool in wavelength division multiplexing (WDM) to separate a signal with closely spaced channels into two signals, e.g. odd and even ITU channels, each with twice the channel spacing. Alternatively, two signals with a large channel spacing can be combined into a single beam with half the channel spacing. The invention relates to an optical interferometer using rhomb prisms as resonant cavities, which, when properly designed, provide the necessary phase shifts for interleaving or de-interleaving sets of optical wavelength channels. The present invention utilizes the differential phase shift between orthogonally polarized components induced by total internal reflection (TIR) off the surfaces of the rhomb prisms. Dispersion reducing techniques are also disclosed, including multiple rhomb interleavers and multi-pass rhomb interleavers.

20 Claims, 10 Drawing Sheets

RHOMB INTERLEAVER

CROSS-REFERENCE TO RELATED APPLICATIONS

This application claims priority from U.S. Patent Applications Nos. 60/302,900 filed Jul. 3, 2001, and 60/307,149 filed Jul. 24, 2001.

TECHNICAL FIELD

The present application relates to optical interleavers, and in particular to a resonator based interleaver using a Fresnel rhomb.

BACKGROUND OF THE INVENTION

Figure 1:
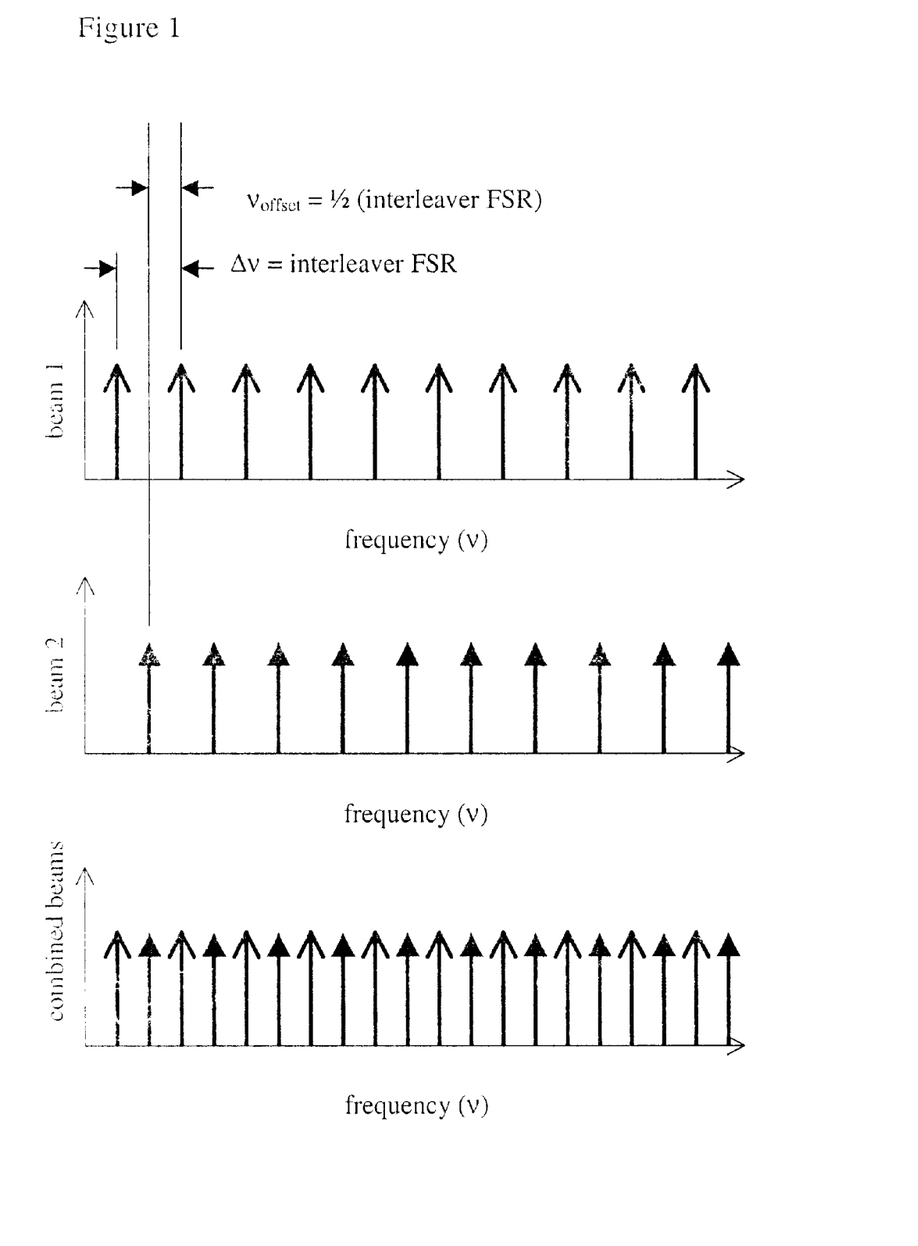
FIG. 1 graphically illustrates the channel spacing of the first and second signals, as well as the combined signal.

It is well known to those skilled in the art of optical dense wavelength division multiplexing (DWDM) that an "interleaving" effect is an efficient and cost-effective means for multiplexing or de-multiplexing optical signals. The interleaving function combines or separates two optical beams, each of which is comprised of signals at a multitude of equally spaced carrier frequencies. With reference to FIG. 1, each of the two beams, beam 1 and beam 2, is comprised of signals whose carrier frequencies are spaced Δv, which is at twice the spacing of the combined signal. The absolute carrier frequencies of these two beams are offset from one another by one-half the frequency spacing of the carrier frequencies in those two beams. This interleaving functionality is highly desirable when constructing optical communications systems employing DWDM technology. Previously, it has been shown that an interleaving effect can be created by the coherent sum and difference of light reflected from two Gires-Tournois Interferometer (GTI) etalon resonators whose phase responses are offset from each other by ½ of their free spectral range (FSR). Copner et al in U.S. Pat. No. 6,125,220 issued Sep. 26, 2000, describe a polarization-insensitive interleaver, which uses a non-polarizing beam-splitter coupled with offset cavities to generate this effect.

In another known interleaver device, the required phase offset is produced by a birefringent crystal element inserted into the cavity of a single GTI etalon resonator to create two independent and properly offset optical paths within one resonator structure. U.S. Pat. No. 6,169,604 issued Jan. 2, 2000 to Cao describes an etalon-based interleaver, which derives a 180° phase difference using an intra-cavity phase biasing element. This device has the disadvantages of complexity of construction, fragility, and high manufacturing cost.

An object of the present invention is to overcome the shortcomings of the prior art by providing a bulk resonator device that does not require complex manufacturing techniques and that does not rely on a birefringent crystal to induce a phase change.

SUMMARY OF THE INVENTION

Accordingly, the present invention relates to a resonator device comprising:
a first reflective surface on a first end face for receiving an input optical beam having S and P components, for reflecting a reflected portion of the input optical beam, and for passing a transmitted portion of the input optical beam;
a second reflective surface for receiving the transmitted portion at an angle resulting in total internal reflection of the transmitted portion, which results in a phase shift between S and P components of the transmitted portion;
a third reflective surface for receiving the transmitted portion from the second reflective surface at an angle resulting in total internal reflection of the transmitted portion, which results in a phase shift between the S and P components of the transmitted portion; and
a fourth reflective surface for receiving the transmitted portion from the third reflective surface, and for reflecting a returning portion of the transmitted portion back via the third and second reflective surfaces to the first reflective surface.

Another aspect of the present invention relates to an interferometer device comprising:
a first port for launching an input optical beam comprising first and second sets of wavelength channels;
first resonator means;
a beam splitter for separating the first set of wavelength channels from the second set of wavelength channels;
a second port for outputting the first set of wavelength channels; and
a third port for outputting the second set of wavelength channels.

The first resonator means includes:
a first reflective surface for reflecting a first portion of the input optical beam, and for transmitting a second portion of the input optical beam;
a second reflective surface for receiving the second portion of the input optical beam from the first reflective surface at an angle resulting in total internal reflection of the second portion of the input optical beam, which results in a phase shift between first and second components thereof;
a third reflective surface for receiving the second portion of the input optical beam from the second reflective surface at an angle resulting in total internal reflection of the second portion of the input optical beam, which results in a phase shift between the first and second components thereof; and
a fourth reflective surface for receiving the second portion of the input optical signal from the third reflective surface, and for reflecting substantially all of the second portion of the input optical beam back to the first reflective surface via the second and third reflective surfaces;
whereby interference between the first and second components results in the first set of wavelength channels being out of phase with the second set of wavelength channels.

Another aspect of the present invention relates to an interleaver device comprising:
an input port for launching an input optical beam comprising odd and even sets of signals;
beam splitting means for splitting the input optical beam into first and second sub-beams;
first Fresnel rhomb resonator means;
second Fresnel rhomb resonator means;
a first output port for outputting the odd set of signals; and
a second output port for outputting the even set of signals.

The first Fresnel rhomb resonator means includes:
a first reflective surface having a reflectivity $R_1$ on a first end thereof, which is optically coupled to the beam splitting means, for receiving the first sub-beam, and for passing a first transmitted portion thereof;
a second reflective surface receiving the first transmitted portion at an angle resulting in total internal reflection thereof causing a phase shift between S and P components of the first transmitted portion;

a third reflective surface receiving the first transmitted portion from the second reflective surface at an angle resulting in total internal reflection thereof causing a phase shift between the S and P components of the first transmitted portion; and a fourth reflective surface having a reflectivity $R_2$ on a second end thereof for reflecting substantially all of the first transmitted portion back towards the beam splitting means.

The second Fresnel rhomb resonator means includes:

a fifth reflective surface having a reflectivity $R_3$ on a first end thereof, which is optically coupled to the beam splitting means, for receiving the second sub-beam, and passing a second transmitted portion;

a sixth reflective surface receiving the second transmitted portion at an angle resulting in total internal reflection thereof causing a phase shift between S and P components of the second transmitted portion;

a seventh reflective surface receiving the second transmitted portion from the sixth reflective surface at an angle resulting in total internal reflection thereof causing a phase shift between the S and P components of the second transmitted portion; and an eighth reflective surface having a reflectivity $R_4$ on a second end thereof for reflecting substantially all of the second transmitted portion back towards the beam splitting means;

whereby the first and second sub-beams interfere causing the odd set of signals to be out of phase with the even set of signals.

BRIEF DESCRIPTION OF THE DRAWINGS

The invention will be described in greater detail with reference to the accompanying drawings which represent preferred embodiments thereof, wherein.

DETAILED DESCRIPTION

The Fresnel Rhomb is a prismatic optical component that has long been used in applications where achromatic ¼-wave optical retardation is needed. Rather than relying on birefringence to create the differential phase shift between orthogonal polarization states, the Fresnel Rhomb takes advantage of the differential phase shift induced by total internal reflection (TIR). In the present invention, a novel resonator structure based on the Fresnel Rhomb is proposed having a desired FSR and differential phase response for S and P polarization states to create all optical interleaver. Unlike the GTI etalon resonator that requires an auxiliary birefringent crystal or other polarization-sensitive device to create the necessary offset in phase response for the two polarization states, a properly-designed Fresnel rhomb automatically creates a round-trip phase shift of 180° between S and P polarization states without resorting to such auxiliary elements. The superposition of equal parts S and P signals emerging from this novel device results in a wideband interleaving function. This simple architecture overcomes the disadvantages of the GTI etalon resonator by virtue of its monolithic construction, robust mechanical integrity, and low manufacturing cost. The novel contribution of this invention is to create a resonator that is substantially different from traditional etalon-based interleavers; the Fresnel rhomb was chosen specifically to introduce the required phase difference via total internal reflection. Additionally, the rhomb is a particularly manufacturable form of this resonator.

Multi-cavity etalon interleaver products do not employ destructive interference, and therefore cannot achieve the isolation of this device. The previous GTI interleaver design requires a high-performance non-polarizing beam-splitter and two GT resonators. The new device would consist of a polarizing beam-splitter and a single rhomb, and would therefore cost considerably less. In addition, since the two polarizations use the same resonator, manufacturing tolerances are reduced. Finally, this device may offer superior bandwidth over prior art designs, since it would not require the phase change of a birefringent crystal (which is a more narrow band effect).

Figure 2:
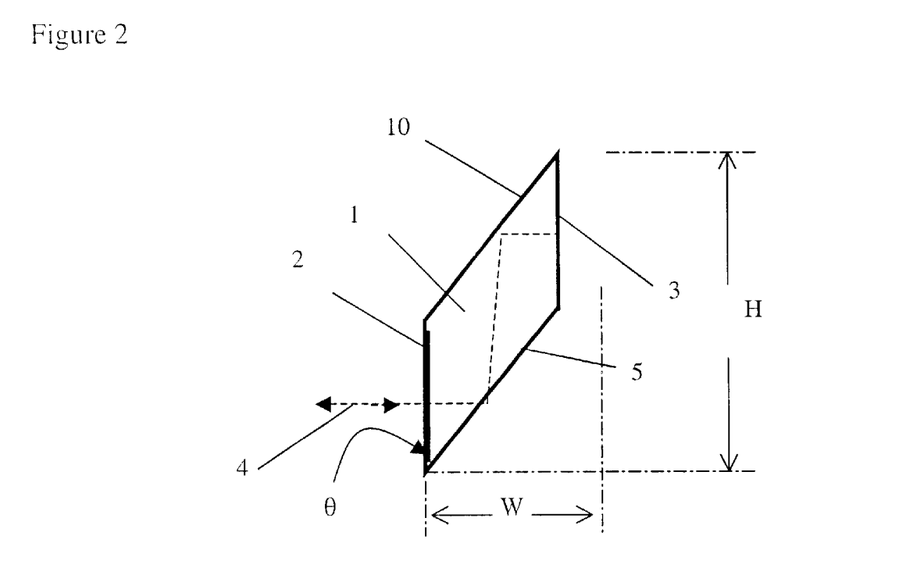
FIG. 2 is a schematic illustration of the Rhomb resonator according to the present invention.

With reference to FIG. 2 the rhomb-resonator interleaver according to the present invention includes a precisely polished Fresnel rhomb 1 having an effective height H, an effective width W, an index of refraction $n_1$, and two essentially fully reflective surfaces 5 and 10. The surface normals of the reflective surfaces 5 and 10 are at an angle beyond the critical angle with respect to the incident beams, thereby producing total internal reflection (TIR) for light normally entering the Rhomb resonator. The total internal reflections at these reflective surfaces 5 and 10 cause a phase shift between the S and P components in the input beam. Front and rear partially reflective surfaces 2 and 3, respectively, which have reflectivity $R_1$ and $R_2$, are positioned on each end of the Fresnel rhomb at an angle θ from the fully reflective surfaces 5 and 10 to create the resonant space. Preferably, $R_1$ ranges between 0% and 50%, while $R_2$ ranges from 90% to 100%. Even more preferably $R_1$ ranges between 12% and 20%, and ideally $R_1$ is 17% to 19%. Preferably, $R_2$ is as close to 100% as possible.

For light entering the rhomb 1, as shown by the solid arrow 4, the rhomb 1 appears to be a resonant cavity. The total optical path length within the rhomb 1 defines the FSR of the rhomb resonator. The amplitude reflection of this cavity is different for S and P polarizations because of the differential phase shifts that occur at the TIR reflections within the rhomb 1. By analyzing the behavior of the two orthogonal polarization components, one can demonstrate that this device is mathematically equivalent in its response to a GTI etalon resonator, while avoiding the inherent disadvantages of the GTI etalon resonator as discussed above.

In order for the rhomb-resonator interleaver to produce the desired FSR, loss and finesse, the parameters H, W, θ, $R_1$ and $R_2$ must be properly designed. It is also necessary to consider the dimensions of the optical beam that will propagate within the rhomb when finalizing its dimensions. For typical optical glass and a FSR of 100 GHz, one finds that the dimensions of the rhomb prism are quite small, i.e. <1 mm. Calculations indicate that this rhomb would accept an input beam diameter of roughly 400 um.

The practical implementation of this device would include standard input and output optics for polarization diversity. The preferred optics, illustrated in FIG. 3, includes a first polarization beam splitter (PBS) stack 6, which includes upper PBS 7 and lower PBS 8. The upper PBS 7 receives S of P polarized light from an input port 9, see FIG. 4. Preferably, the input port 9 receives the light from an input fiber 11 via a lens 12 and divides the light into two orthogonally polarized sub-beams 13a and 13b using a birefringent crystal 14. A half-wave plate 15 rotates the polarization of one of the sub-beams, e.g. 13b, so that both sub-beams 13a and 13b have the same polarization state, e.g. S polarized. Subsequently, the sub-beams 13a and 13b proceed through a non-reciprocal rotator 16, a bottom PBS 17 of a PBS stack 18, and a waveplate 19 before entering the Fresnel rhomb 1.

Figure 3:
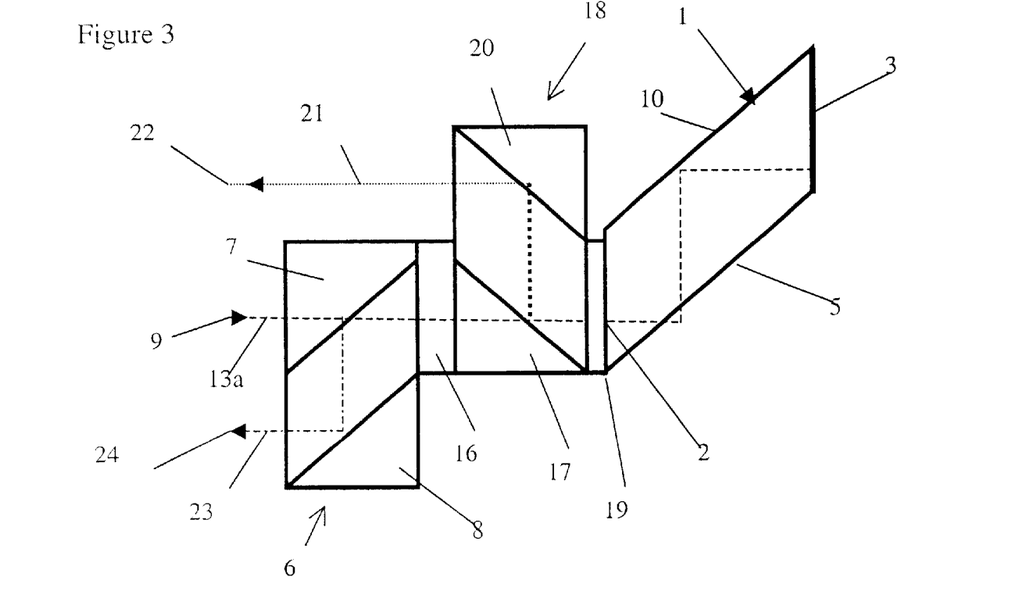
FIG. 3 is a schematic illustration of one embodiment of the interleaver device according to the present invention.
Figure 4:
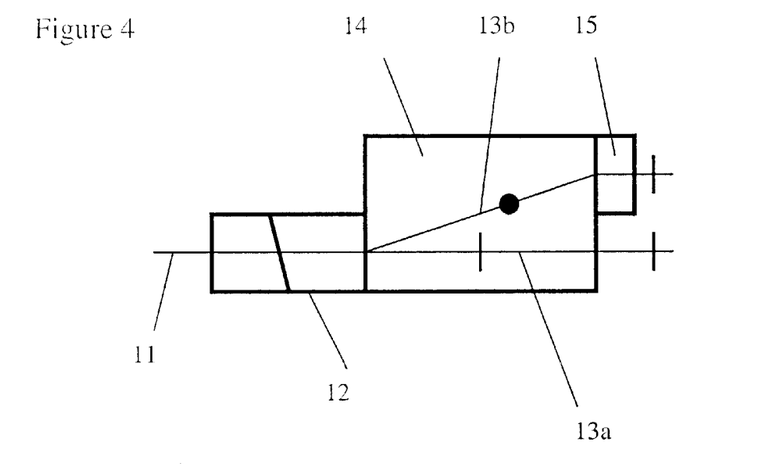
FIG. 4 is a schematic illustration of an input port of the interleaver device of FIG. 3.

The non-reciprocal rotator 16 preferably comprises a Faraday rotator and a half-wave plate, whereby the state of polarization of sub-beams initially passing therethrough is unaffected, while the polarization of sub-beams passing therethrough on the return trip are rotated by 90°.

Preferably a waveplate 19 is used for adjusting the polarization states of the two input beams 12 and 13 as they emerge from the polarization diversity optics in order to achieve proper balance of S and P states in each path of the Rhomb. It is also possible to use another auxiliary single TIR prism element to effect this polarization state adjustment. In some cases it is also possible to align the elements of the device at the proper angles to avoid using these elements. Angle tuning can be used to make fine adjustments to the FSR that may be required as a result of fabrication tolerances of the Rhomb.

In this case $R_1$ is approximately 19%, while $R_2$ is approximately 100%. Accordingly, after passing through the Fresnel rhomb 1 a stream of channels with alternating polarizations is created. The P polarized channels 21 (e.g. odd ITU channels) get reflected by the bottom PBS 17 to a top PBS 20, which reflects the odd channels 21 to a first output port 22. Output port 22 is similar to input port 9, whereby the two P polarized channel sub-beams are combined for output onto an output waveguide (not shown). S polarized channels 23 (e.g. even ITU channels) pass through bottom PBS 17, anti non-reciprocal rotator 16, which rotates their polarization by 90°. Accordingly, the even channel sub-beams get reflected by the upper PBS 7 to the lower PBS 8, which reflects the even channel sub-beams to a second output port 24. The second output port 24 is similar to the first output port 22. The above description represents the device in use as a de-interleaver; however, one skilled in the art can easily see that this device can work in reverse as an interleaver for channels.

Figure 5:
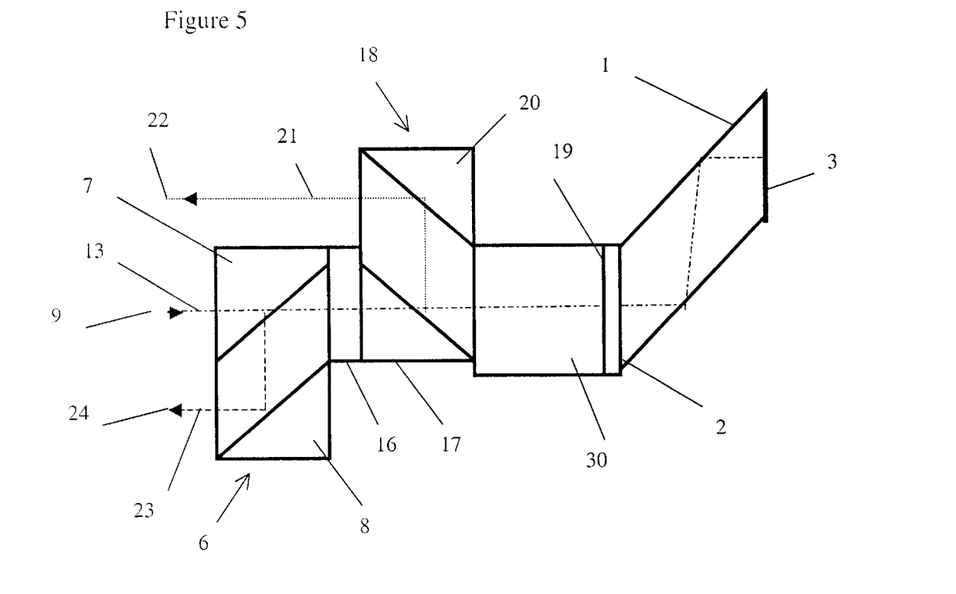
FIG. 5 is a schematic illustration of another embodiment of the interleaver device according, to the present invention.

Preferably, an additional optical path length of half the cavity length of the resonator is incorporated into one of the paths of the S and P components. If we assume the cavity length to be 2L=c/FSR then the delay would be L=c/(2× FSR). FIG. 5 illustrates a device, which is identical to the device of FIG. 3 except for the addition of a thick waveplate 30 for imposing the desired retardance L. In this case the reflectivity $R_1$ is very low, e.g. 2%, while the reflectivity $R_2$ remains as high as possible, i.e. approximately 100%.

Figure 6:
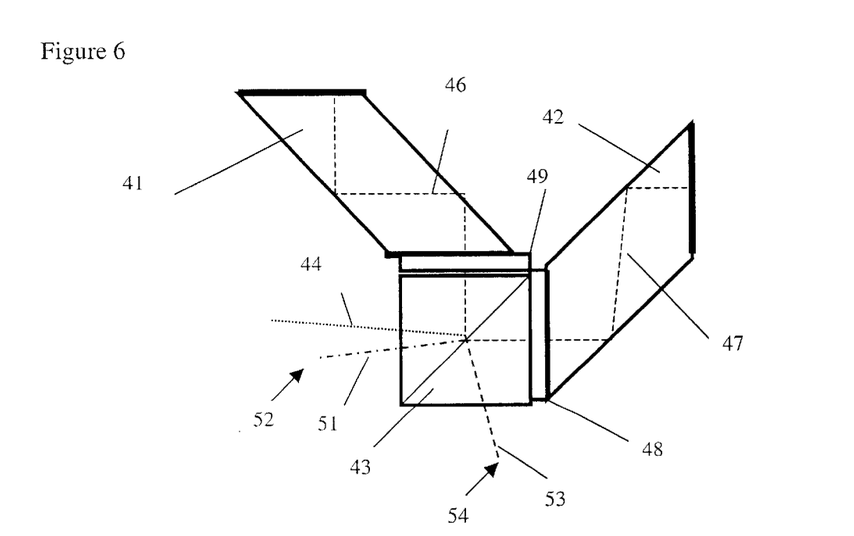
FIG. 6 is a schematic illustration of another embodiment of the interleaver device according to the present invention.

FIG. 6 illustrates another embodiment of the invention in which much of the front end optics can be avoided by providing two Fresnel Rhombs 41 and 42 and a single PBS 43. Accordingly, the input and output ports will not require birefringent crystals, and a light beam 44 can be input directly from the waveguide 10 via lens 11. The PBS 43 divides the beam 44 into an S polarized sub-beam 46, which is directed towards Fresnel Rhomb 41, and a P polarized sub-beam 47, which is passed through to Fresnel Rhomb 42. Again, the polarization of sub-beams 46 and 47 is altered by waveplates 48 and 49, respectively, before entering their respective resonators 41 and 42. When the sub-beams 46 and 47 return from the resonators 41 and 42, respectively, the like polarized even channels 51 are combined in the PBS 43, which passes them to a first output port 52, while the like polarized odd channels 53 are combined in the PBS 43, which reflects them to a second output port 54.

It is also possible to replace the PBS 43 with a non-polarizing beam splitter, which would also eliminate the need for the waveplates 48 and 49.

In addition, because this is a bulk (vs. air cavity) device, temperature stabilization will be required. This temperature control can additionally be used to fine-tune the alignment of the device's spectral response to the ITU grid. A possible long-term work-around to this requirement would be the development of a specialty optical glass that provides zero change in optical path length with temperature.

Figure 7:
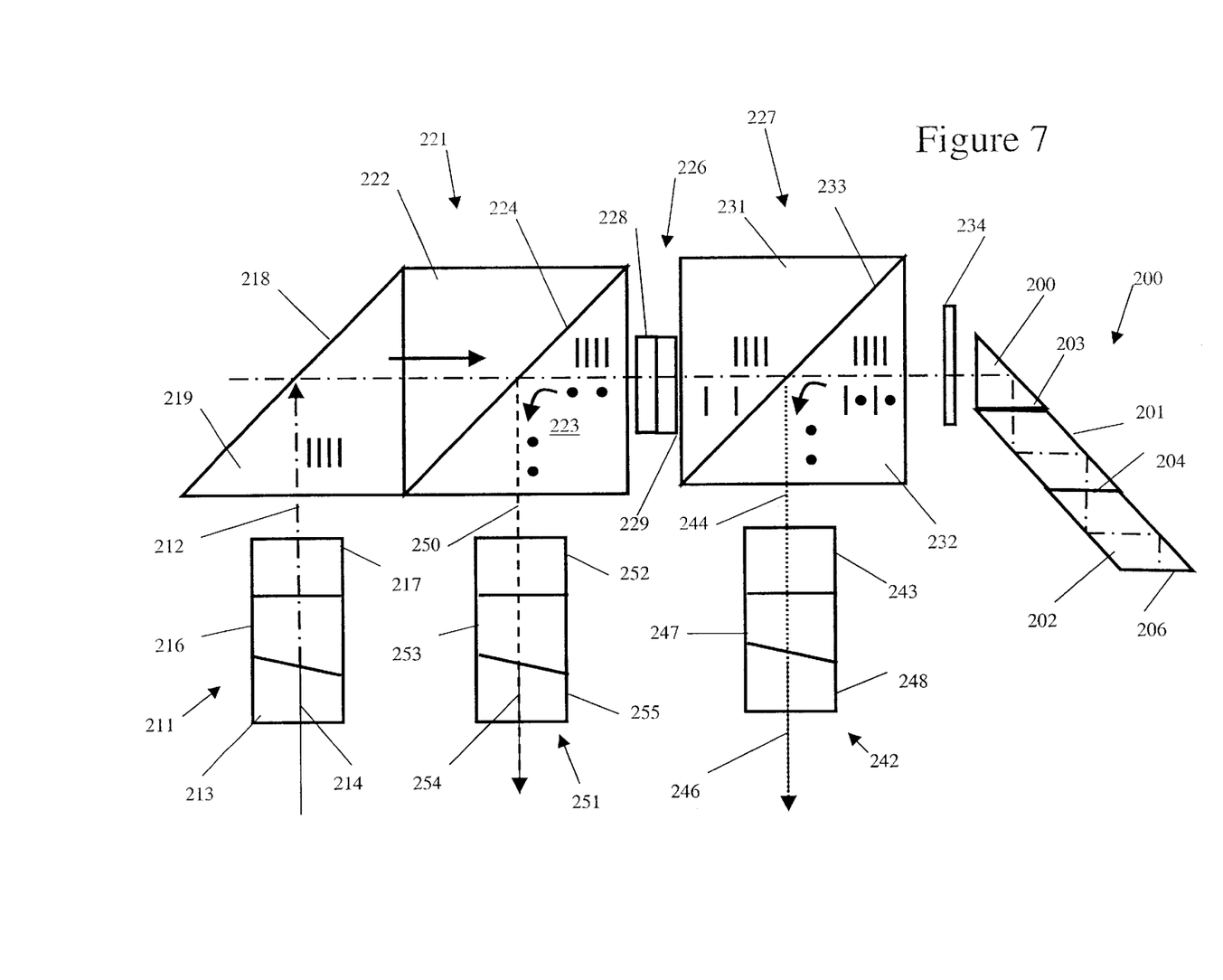
FIG. 7 is a schematic illustration of a double rhomb interleaver according to another embodiment of the present invention.

FIG. 7 illustrates a preferred embodiment of the present invention, which provides low dispersion of the group delay for interleaving or de-interleaving optical channel wavelengths spaced as close together as 25 GHz or 50 GHz. The double rhomb interleaver 200 includes a first rhomb 201 and a second rhomb 202. The first rhomb 201 has a first partially reflective surface 203, which typically ranges between 0% and 5%, preferably ranges between 0.3% and 1.5%, but is ideally 0.7%. A second partially reflective surface 204 is applied between the first and second rhombs 201 and 202, respectively, which typically ranges between 5% and 25%, preferably ranges between 10% and 18%, but is ideally 14%. The end face of the second rhomb 202 is coated with a substantially fully reflective coating 206 for reflecting light back through the interleaver 200. In this embodiment a triangular prism 207 is used to provide the initial λ/8 adjustment. Typically, the four surfaces of the rhombs 201 and 202 where the TIR takes place are uncoated glass. However, it is possible to utilize multi-layer thin film interference coatings to provide a phase control different that the λ/8 wave normally provided.

For the sake of simplicity, we will describe the interleaver 200 in relation to the de-interleaving process. However, the interleaver 200 can be used to interleave wavelength channels by simply reversing the process. The polarization diversity front end illustrated in FIG. 7 includes a first port 211 for launching a beam of light 212, which includes a series of wavelength division multiplexed (WDM) channels. The first port 211 includes a ferrule tube 213 encasing an end of an optical fiber 214, and a collimating lens 216. A birefringent crystal 217 is used to separate the input beam 212 into two orthogonally polarized sub-beams, and a waveplate (not shown) is used to rotate the polarization of one of the sub-beams so both sub-beams have the same first polarization, e.g. vertical. See the description of FIG. 4 above. The sub-beams of input signal 212 reflect off a reflective surface 218 coated onto a triangular prism 219 towards a first polarization beam splitter (PBS) 221. The first PBS 221 is comprised of two triangular prisms 222 and 223 with a polarization beam splitting coating 224 applied therebetween. The first PBS 221 is designed to pass light of the first polarization therethrough. The sub-beams of the input signal 212 then pass through a non-reciprocal polarization rotator 226 to a second PBS 227. The non-reciprocal polarization rotator 226 is comprised of a Faraday rotator 228 and a half wave plate 229. In this example the non-reciprocal polarization rotator 226 is designed to have no resultant effect on the polarization of light passing from the first PBS 221 to the second PBS 227 while rotating the polarization of light passing in the opposite direction by 90°. The second PBS 227 is comprised of two triangular prisms 231 and 232 with a polarization beam splitting coating 233 therebetween. Again, in this example, the second PBS 227 is designed to pass light with the first polarization to the rhomb interleaver 200. A half wave plate 234 is provided to reorient the sub-beams of the input signal 212 before entering the rhomb interleaver 200.

In the preferred embodiment, passage through the rhomb interleaver 200 results in the even set of ITU channels having one polarization, while the odd set of ITU channels having an orthogonal polarization. Accordingly, after the signal reappears from the rhomb interleaver 200, both sub-beams of one of the sets of channels, i.e. with the second polarization, is reflected by the second PBS 227 towards a second port 242, while the other set of channels with the first polarization is passed therethrough. The second port 242, like the first port 211, includes a half wave plate (not shown) for rotating one of the sub-beams, whereby the two sub-beams of the first set of channels have orthogonal polarizations. A birefringent crystal 243 then recombines the two sub-beams into a single output beam 244, which is focused onto an end of a fiber 246 by a lens 247. The end of the fiber 246 is encased in a ferrule tube 248. The other set of channels passes through the non-reciprocal rotator 226, which in this direction rotates the polarization of the remaining signal by 90° from the first polarization to the second polarization. As a result, the other set of channels 250 is then reflected by the first PBS 221 to a third port 251. The third port 251 includes a waveplate (not shown), a birefringent crystal 252, a lens 253, and a fiber 254 with a ferrule tube 255 all for the same purposes as in the second port 242.

Figure 8:
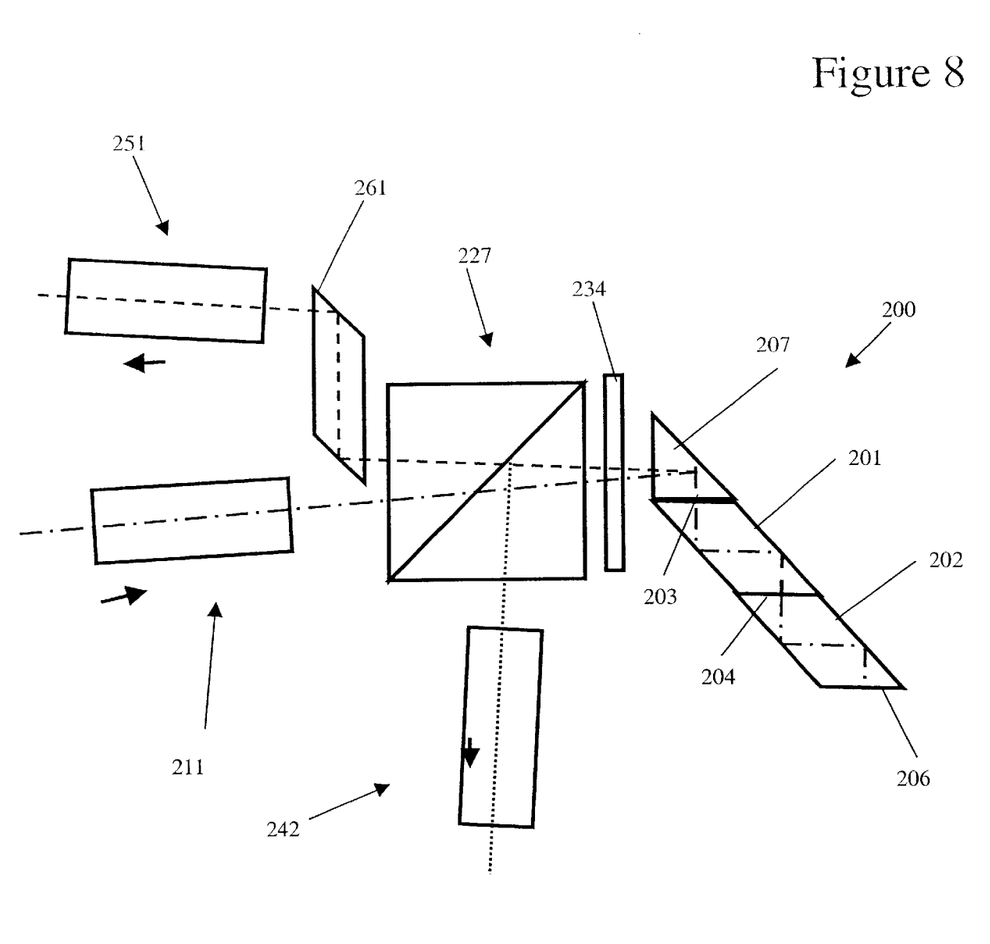
FIG. 8 is a schematic illustration of another embodiment of the double rhomb interleaver of FIG. 7.

With reference to FIG. 8, to eliminate the need for the first PBS 221 and the non-reciprocal polarization rotator 226, the light from the first port 211 can be launched at an angle, i.e. non-normal, to the second PBS 227, which enables the light returning from the rhomb interleaver 200 to follow a different path. Accordingly, light traveling to the third port 251 can simply be redirected using a prism 261.

Figure 9:
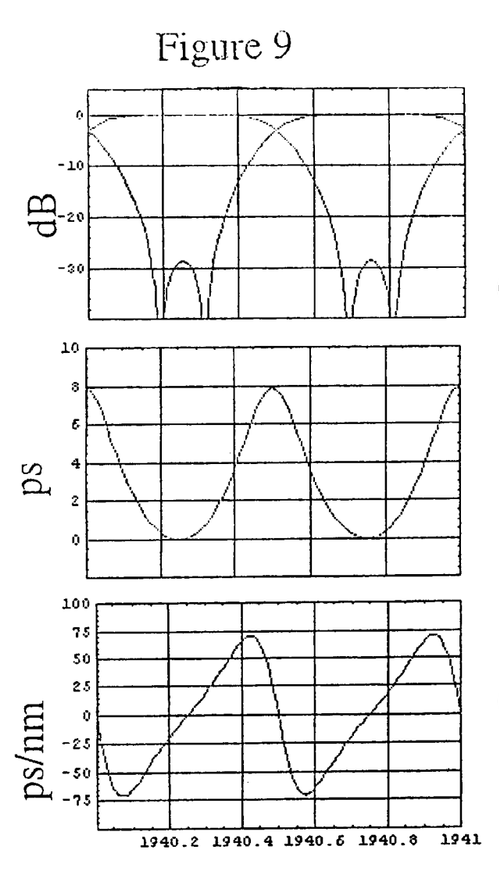
FIGS. 9a, 9b, and 9c are the spectral, the group delay and the dispersion responses, respectively, for a single rhomb interleaver according to the present invention.
Figure 10:
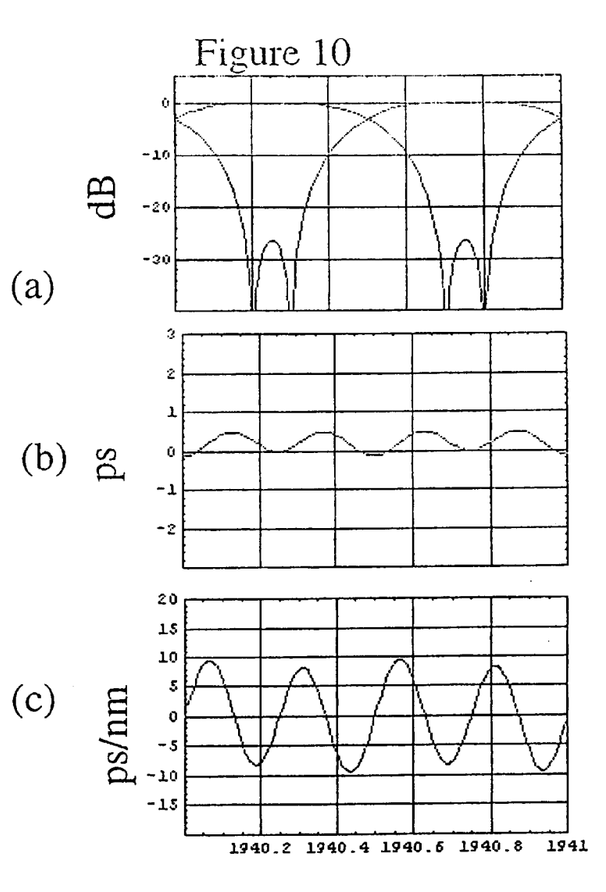
FIGS. 10a, 10b, and 10c are the spectral, the group delay and the dispersion responses, respectively, for a double rhomb interleaver according to the present invention.

FIGS. 9a, 9b and 9c represent the spectral response, the group delay, and the chromatic dispersion, respectively of a single rhomb interleaver, while FIGS. 10a, 10b and 10c represent the spectral response, the group delay and the chromatic dispersion, respectively, of a double rhomb interleaver. The single rhomb interleaver has a front partially reflective surface at approximately 18% and a real reflective surface at approximately 100%. The incident angle is 45°, while the critical angle is 41.9°. The index of refraction is approximately 1.554. Clearly, for the double Rhomb interleaver the group delay is lowered by a factor of 16, while the dispersion is lowered by a factor of 7. The low reflectivity front surface of the first rhomb 201 adjusts the shark-finned dispersion response of the single rhomb interleaver (FIG. 9c) making it more symmetrical, thereby enabling the dispersion to be compensated for during recombination of the S and P components.

Figure 11A:
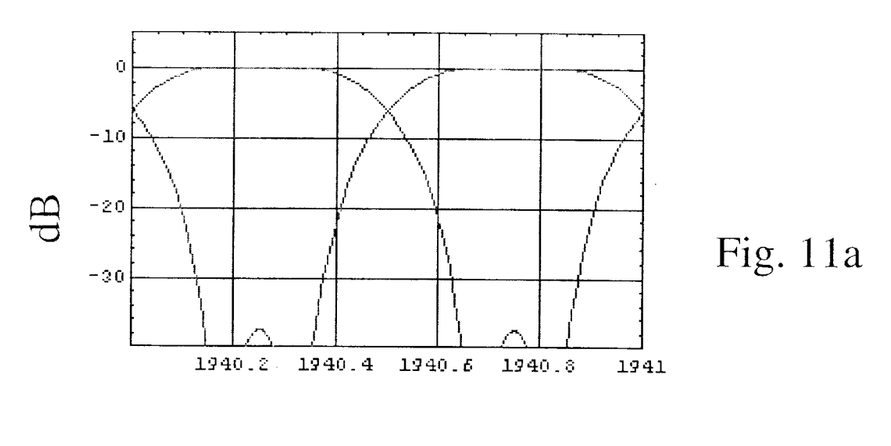
FIGS. 11a and 11b are the spectral and dispersion responses, respectively, for a double-passed single rhomb interleaver according to the present invention.
Figure 11B:
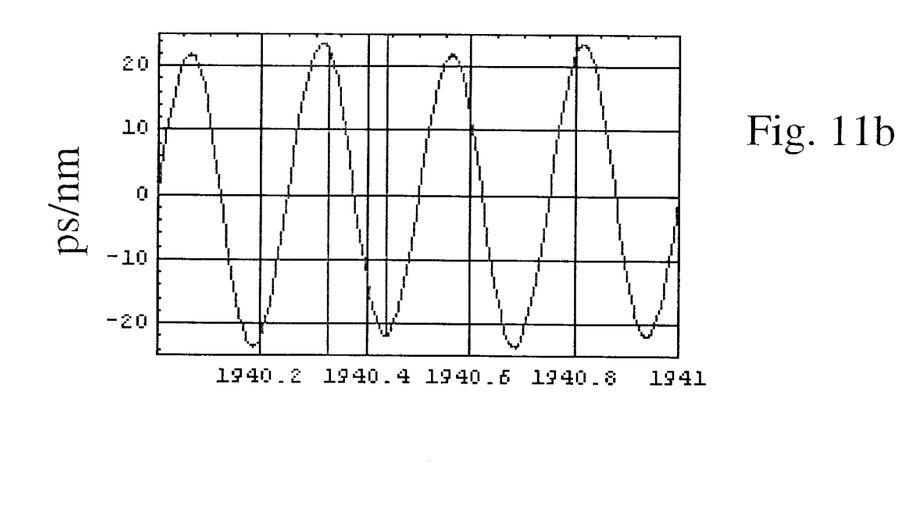

Another way to adjust the shape of the passband is to reflect the signal through a single rhomb interleaver twice, i.e. double pass. FIGS. 11a and 11b illustrate the spectral response and dispersion, respectively, for a double passed single rhomb interleaver as defined above. In this example, the ripple is greatly reduced and the dispersion is reduced to approximately 24 ps/nm.

Figure 12A:
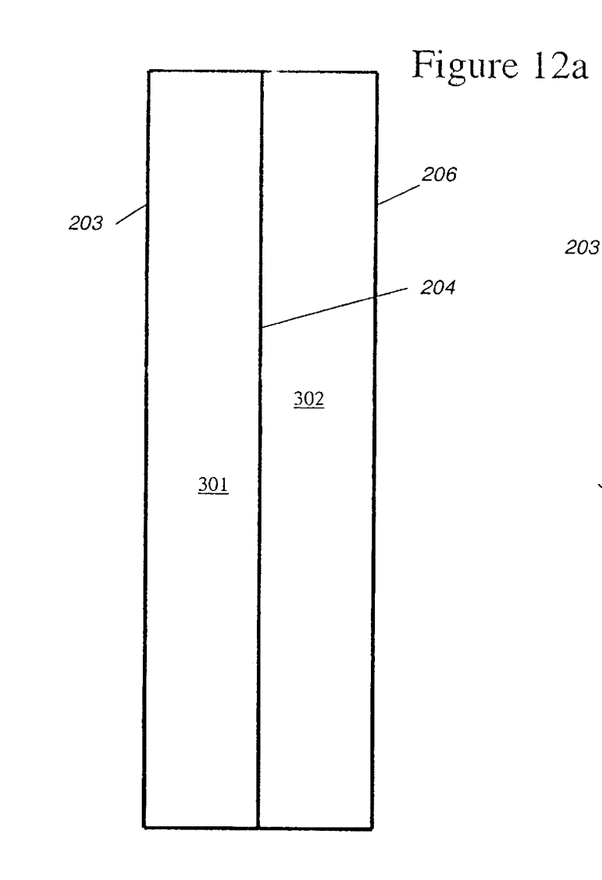
FIGS. 12a and 12b illustrate to process steps in the manufacture of a multiple-rhomb interleaver according to the present invention.
Figure 12B:
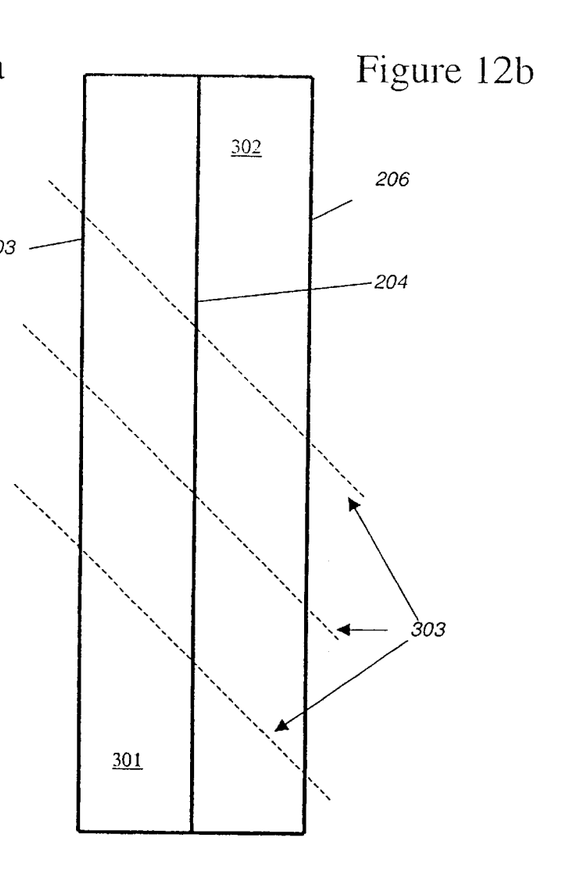

Fabrication of the double rhomb interleaver 200 can be facilitated by initially optically contacting and bonding two optical flats 301 and 302, as in FIG. 12a. The optical flats 301 and 302 are highly polished as close as possible to the precisely matching thickness. The first partially reflective coating 203 and the fully reflective coating 206 can be applied either before or alter the bonding of the optical flats 301 and 302. Obviously, the second partially reflective surface 204 must be applied prior to bonding. The optical thicknesses of the optical flats 301 and 302 can be tested prior to dicing, and the thicknesses can be adjusted by removing more material or adding a coating layer of the same refractive index. The optical slats 301 and 302 are then diced and polished along lines 303 for use.

Figure 13:
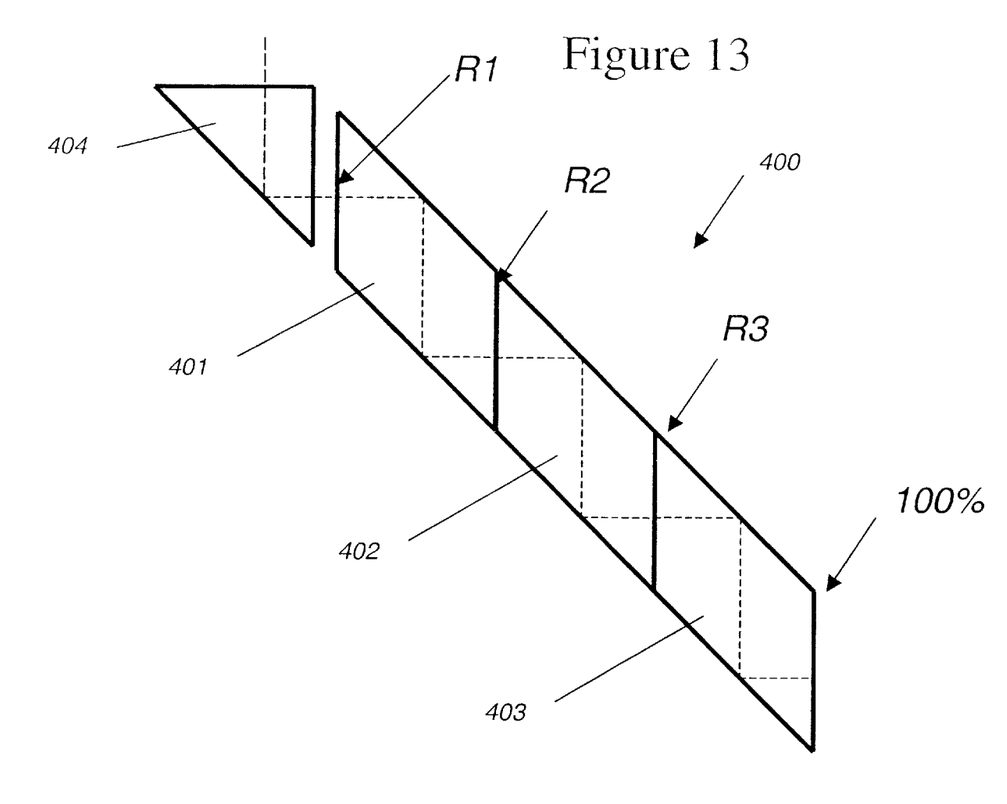
FIG. 13 illustrates a triple rhomb interleaver according to another embodiment of the present invention.

FIG. 13 illustrates another embodiment of a rhomb interleaver 400 according to the present invention in which three rhombs 401, 402 and 403 with three partially reflective surfaces 401, 402 and 403 are used to reduce the resultant chromatic dispersion by even more. The λ/8 adjustment is again provided by a triangular prism 404. The reflectivities $R_1$, $R_2$ and $R_3$ are again chosen to provide desired spectral and dispersion responses.

We claim:

1. An interferometer device comprising:
   a first port for launching an input optical beam comprising first and second sets of wavelength channels;
   first resonator means including:
   a first reflective surface for reflecting a first portion of the input optical beam, and for transmitting a second portion of the input optical beam;
   a second reflective surface for receiving the second portion of the input optical beam from the first reflective surface at an angle resulting in total internal reflection of the second portion of the input optical beam, which results in a phase shift between first and second components thereof;
   a third reflective surface for receiving the second portion of the input optical beam from the second reflective surface at an angle resulting in total internal reflection of the second portion of the input optical beam, which results in a phase shift between the first and second components thereof; and
   a fourth reflective surface for receiving the second portion of the input optical signal from the third reflective surface, and for reflecting substantially all of the second portion of the input optical beam back to the first reflective surface via the second and third reflective surfaces;

whereby interference between the first and second components results in the first set of wavelength channels being out of phase with the second set of wavelength channels;

a beam splitter for separating the first set of wavelength channels from the second set of wavelength channels;

a second port for outputting the first set of wavelength channels; and a third port for outputting the second set of wavelength channels.

2. The device according to claim 1, wherein the first reflective surface is parallel to the fourth reflective surface, and the second reflective surface is parallel to the third reflective surface.

3. The device according to claim 2, further comprising phase shifting means for imposing a phase shift between first and second components of the input optical beam; and wherein the beam splitter comprises a first polarization beam splitter for directing the input optical beam having a first polarization towards the phase shifting means, for directing the first set of wavelength channels having a second polarization to the second port, and for directing the second set of wavelength channels having the first polarization to the third port.

4. The device according to claim 3, wherein the phase shifting means induces about a $\lambda/8$ phase shift between the first and second components of the input optical beam.

5. The device according to claim 4, wherein the phase shifting means includes a reflective surface for receiving the input optical beam at an angle resulting in total internal reflection of the input optical beam, which results in a phase shift between the first and second components thereof.

6. The device according to claim 5, wherein the total internal reflections from the second and third reflective surfaces combine to induce about a $\lambda/4$ phase shift between the first and second components of the second portion of the input optical beam.

7. The device according to claim 6, wherein the first reflective surface has a reflectivity between 0% and 50%; and the fourth reflective surface has a reflectivity between 90% and 100%.

8. The device according to claim 7, wherein the first reflective surface has a reflectivity between 12% and 20%.

9. The device according to claim 7, wherein the first set of wavelength channels comprises one or more of the odd ITU channels; and wherein the second set of wavelength channels comprises one or more of the even ITU channels.

10. The device according to claim 7, further comprising reflecting means for directing light exiting the resonator means back therethrough for a second time.

11. The device according to claim 7, further comprising second resonator means between said phase shifting means and said first resonator means;

wherein said second resonator means comprises:
a fifth reflective surface for reflecting a third portion of the input optical beam, and for transmitting a fourth portion of the input optical beam;
a sixth reflective for receiving the fourth portion of the input optical beam from the fifth reflective surface at an angle resulting in total internal reflection of the fourth portion of the input optical beam, which results in a phase shift between first and second components thereof;
a seventh reflective surface for receiving the fourth portion of the input optical beam from the sixth reflective surface at an angle resulting in total internal reflection of the fourth portion of the input optical beam, which results in a phase shift between the first and second components thereof, and for reflecting the fourth portion of the input optical beam to the first reflective surface.

12. The device according to claim 11, wherein the fifth reflective surface has a reflectivity of between 0.3% and 1.5%; and wherein the first reflective surface has a reflectivity of between 10% and 18%.

13. The device according to claim 1, wherein at least one of the second and the third reflective surfaces includes a multi-layer thin film interference coating for adjusting the phase shift between the first and second components.

14. The device according to claim 1, further comprising retarding means for inducing a delay between the first and second components of the input optical beam before entering the first resonator means.

15. The device according to claim 13, wherein the delay is substantially equal to half of a cavity length of the first resonator means.

16. An interleaver device comprising:
an input port for launching an input optical beam comprising odd and even sets of signals;
beam splitting means for splitting the input optical beam into first and second sub-beams;
first Fresnel rhomb resonator means including:
a first reflective surface having a reflectivity $R_1$ on a first end thereof, which is optically coupled to the beam splitting means, for receiving the first sub-beam, and for passing a first transmitted portion thereof;
a second reflective surface receiving the first transmitted portion at an angle resulting in total internal reflection thereof causing a phase shift between S and P components of the first transmitted portion;
a third reflective surface receiving the first transmitted portion from the second reflective surface at an angle resulting in total internal reflection thereof causing a phase shift between the S and P components of the first transmitted portion; and
a fourth reflective surface having a reflectivity $R_2$ on a second end thereof for reflecting substantially all of the first transmitted portion back towards the beam splitting means;
second Fresnel rhomb resonator means including:
a fifth reflective surface having a reflectivity $R_3$ on a first end thereof, which is optically coupled to the beam splitting means, for receiving the second sub-beam, and passing a second transmitted portion;
a sixth reflective surface receiving the second transmitted portion at an angle resulting in total internal reflection thereof causing a phase shift between S and P components of the second transmitted portion;
a seventh reflective surface receiving the second transmitted portion from the sixth reflective surface at an angle resulting in total internal reflection thereof causing a phase shift between the S and P components of the second transmitted portion; and
an eighth reflective surface having a reflectivity $R_4$ on a second end thereof for reflecting substantially all of the second transmitted portion back towards the beam splitting means;
whereby the first and second sub-beams interfere causing the odd set of signals to be out of phase with the even set of signals;

a first output port for outputting the odd set of signals; and a second output port for outputting the even set of signals.

17. The interleaver according to claim 16, further comprising:

first phase shifting means for providing an initial phase shift between S and P components of the first sub-beam; and second phase shifting means for providing an initial phase shift between S and P components of the second sub-beam;

wherein the beam splitting means is a polarization beam splitter.

18. A resonator device comprising:

a Fresnel rhomb;

a first reflective surface on a first end face of said Fresnel rhomb for receiving an input optical beam having S and P components, for reflecting a reflected portion of the input optical beam, and for passing a transmitted portion of the input optical beam;

a second reflective surface for receiving the transmitted portion at an angle resulting in total internal reflection of the transmitted portion, which results in a phase shift between S and P components of the transmitted portion;

a third reflective surface for receiving the transmitted portion from the second reflective surface at an angle resulting in total internal reflection of the transmitted portion, which results in a phase shift between the S and P components of the transmitted portion; and a fourth reflective surface on a second end face of said Fresnel rhomb for receiving the transmitted portion from the third reflective surface, and for reflecting a returning portion of the transmitted portion back via the third and second reflective surfaces to the first reflective surface.

19. The device according to claim 18, wherein the first reflective surface is parallel to the fourth reflective surface, and the second reflective surface is parallel to the third reflective surface.

20. The device according to claim 18, wherein the fourth reflective surface has a reflectivity between 90% and 100%.

* * * * *